United States Patent
Lippa et al.

(10) Patent No.: US 7,110,904 B2
(45) Date of Patent: *Sep. 19, 2006

(54) CONTROL STRATEGY FOR AN INTERNAL COMBUSTION ENGINE IN A HYBRID VEHICLE

(75) Inventors: Allan J. Lippa, Northville, MI (US); Diana D. Brehob, Dearborn, MI (US); Jialin Yang, Canton, MI (US); Lifeng Xu, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 478 days.

This patent is subject to a terminal disclaimer.

(21) Appl. No.: 10/157,690

(22) Filed: May 29, 2002

(65) Prior Publication Data
US 2003/0033074 A1    Feb. 13, 2003

Related U.S. Application Data

(63) Continuation of application No. 09/682,240, filed on Aug. 9, 2001, now Pat. No. 6,421,599.

(51) Int. Cl.
*F01N 3/20*    (2006.01)
*F02B 73/00*    (2006.01)

(52) U.S. Cl. .................... 702/102; 60/277; 60/285; 60/698; 60/311

(58) Field of Classification Search ............ 123/41.1, 123/41.31, 142.5 E; 701/102, 103, 114, 701/115; 60/274, 277, 299, 300, 301, 303, 60/698, 311, 716, 718, 719, 285; 237/2 A
See application file for complete search history.

(56) References Cited

U.S. PATENT DOCUMENTS

| 4,403,473 A | 9/1983 | Gladden ................... 60/274 |
| 4,403,476 A | 9/1983 | Johnson et al. ............ 60/652 |
| 4,854,123 A | 8/1989 | Inoue ....................... 60/274 |
| 5,201,802 A | 4/1993 | Hirota et al. .............. 60/276 |
| 5,209,061 A | 5/1993 | Takeshima ................ 60/278 |
| 5,323,868 A | 6/1994 | Kawashima ......... 123/142.5 E |
| 5,345,761 A | 9/1994 | King et al. ................ 60/303 |
| 5,367,875 A | 11/1994 | Aboujaoude et al. ....... 60/303 |
| 5,369,956 A | 12/1994 | Daudel et al. ............. 60/276 |
| 5,497,941 A | 3/1996 | Numazawa et al. ........ 237/2 A |
| 5,522,218 A | 6/1996 | Lane et al. ................ 60/274 |
| 5,540,047 A | 7/1996 | Dahlheim et al. .......... 60/274 |
| 5,609,022 A | 3/1997 | Cho ......................... 60/274 |
| 5,609,026 A | 3/1997 | Berriman et al. .......... 60/286 |
| 5,628,186 A | 5/1997 | Schmelz ................... 60/274 |
| 5,845,487 A | 12/1998 | Fraenkle et al. ........... 60/274 |
| 5,862,497 A | 1/1999 | Yano et al. ................ 701/103 |
| 5,875,864 A | 3/1999 | Yano et al. ........... 123/198 DB |
| 5,924,280 A | 7/1999 | Tarabulski ................ 60/274 |
| 5,934,073 A | 8/1999 | Gieshoff et al. ........... 60/303 |

(Continued)

FOREIGN PATENT DOCUMENTS

FR    2 784 626    4/2000

(Continued)

*Primary Examiner*—Willis R. Wolfe, Jr.
(74) *Attorney, Agent, or Firm*—Allan J. Lippa; Alleman Hall McCoy Russell & Tuttle LLP

(57) ABSTRACT

A system and method is disclosed for operating an internal combustion engine disposed in a hybrid vehicle, in which engine operation is selected to provide secondary vehicular functions, such as cabin heating, cabin cooling, and exhaust aftertreatment of exhaust components.

8 Claims, 3 Drawing Sheets

U.S. PATENT DOCUMENTS

| | | | |
|---|---|---|---|
| 5,950,422 A | 9/1999 | Dolling | 60/274 |
| 6,018,694 A | 1/2000 | Egami et al. | 701/102 |
| 6,082,102 A | 7/2000 | Wissler et al. | 60/286 |
| 6,089,015 A | 7/2000 | Strehlau et al. | 60/274 |
| 6,119,451 A | 9/2000 | Vogtlin et al. | 60/274 |
| 6,125,629 A | 10/2000 | Patchett | 60/286 |
| 6,164,063 A | 12/2000 | Mendler | 60/274 |
| 6,173,569 B1 | 1/2001 | Kusada et al. | 60/277 |
| 6,421,599 B1 * | 7/2002 | Lippa et al. | 701/102 |

FOREIGN PATENT DOCUMENTS

| | | |
|---|---|---|
| JP | 11-247679 | 9/1999 |
| JP | 2000-45814 | 2/2000 |
| JP | 2000-54838 | 2/2000 |
| JP | 2000-104629 | 4/2000 |

* cited by examiner

CONTROL STRATEGY FOR AN INTERNAL COMBUSTION ENGINE IN A HYBRID VEHICLE

This application is a continuation of U.S. patent application Ser. No. 09/682,240, filed on Aug. 9, 2001, now U.S. Pat. No. 6,421,599, entitled "Control Strategy For An Internal Combustion Engine in a Hybrid Vehicle", assigned to the assignee of the parent application, and incorporated in its entirety herein by reference.

BACKGROUND OF INVENTION

The invention relates to a system and method to operate an internal combustion engine to facilitate the operation of secondary devices, such as emission aftertreatment devices, which depend on the operating condition of the engine to which they are coupled. In the present invention, the internal combustion engine is part of a hybrid vehicle system.

The primary function of an automobile is to transport passengers and cargo. There are, however, secondary vehicular functions including cooling the vehicle cabin, heating the vehicle cabin, and exhaust aftertreatment functions to lower the emission of regulated gaseous components from the vehicle which are performed as well. In a conventional vehicle, the operating condition of the engine must be selected to provide the torque demanded by the operator. The secondary functions are typically attended to by operating the engine at a condition which provides the desired power but may be less than a desirable operating condition from the standpoint of providing the best function of the engine dependent auxiliary device, i.e., the device which provides the secondary function. Several examples of the problems encountered in providing secondary functions in conventional vehicles follow.

If the temperature in a vehicle cabin increases above a set point of an air-conditioner thermostat, engine power is increased to provide power to drive the air conditioning compressor, while desired power at the wheels, i.e., the primary function. Increasing the power level of the engine is inefficient at many operating conditions. Clearly, it would not be satisfactory to the operator of the vehicle to delay air conditioning until the engine happened to be at a desirable condition to facilitate efficient employment of the air conditioner. Thus, in a conventional vehicle, the engine power is raised and a large fuel penalty may result.

A diesel engine equipped with a diesel particulate filter requires periodic regeneration of the filter to avoid complete occlusion of the filter. There are engine operating conditions which could cause the carbonaceous material collected in the filter to spontaneously ignite and oxidize. However, the filter must be regenerated at the time that it has become full, regardless of the current engine operating condition. Prior art approaches include electrically heating the particulate filter to the auto ignition temperature of the particulate matter, providing a burner in the exhaust system to ignite the particulate matter, operating the engine at a retarded injection timing or with exhaust gas recirculation (EGR) to cause the exhaust temperature to rise, and others. However, all prior art methods penalize fuel efficiency and many of them do not guarantee regeneration success over all possible operating scenarios.

A further example of a problem in operating a secondary device occurs in diesel-equipped conventional vehicles in which cabin heating is notably slow. Measures may be undertaken to cabin warm up. However, these measures negatively impact fuel economy and are insufficient to provide the desired cabin comfort to the operator. Thus, heating of the cabin may be delayed until an engine operating condition is accessed which can satisfy both the primary function, i.e., power at the driving wheels, and the secondary function, heating the cabin.

Yet another example of a challenge in providing a secondary function in a vehicle is in managing lean NOx traps (LNTs) for exhaust aftertreatment of homogeneous charge (fuel and air premixed) and stratified charge (fuel and air separated) lean burn engine exhaust. LNTs collect NOx during lean operation of the engine and subsequently release and react the NOx during a period of rich operation. One of the difficulties encountered in conventional vehicles utilizing an LNT is in maintaining smooth torque in making transitions between lean and rich operation to purge the LNT of NOx.

The inventors of the present invention have recognized a method to operate a hybrid vehicle system, i.e., one with an internal combustion engine and another machine which may provide motive force to the wheels, in such a manner to satisfy or attend to demands of engine dependent auxiliary devices to better provide secondary functions, such as emission control, cabin heating, and cabin cooling.

SUMMARY OF INVENTION

A hybrid vehicle system including at least two machines capable of being coupled to and capable of providing motive force to the vehicle's driving wheels is provided. One of the machines is an internal combustion engine. The system includes one or more engine dependent auxiliary devices which are coupled to the internal combustion engine. An engine controller determines whether a current engine operating condition satisfies an engine dependent auxiliary device and if the engine dependent auxiliary device is not satisfied, the engine controller determines a desired engine operating condition to satisfy the engine dependent auxiliary device. The engine dependent auxiliary device may be a NOx trap, a lean NOx catalyst, a particulate filter, a fuel vapor purge system, a compressor of an air conditioning unit, and a heat exchanger for transferring heat to a cabin of the vehicle.

A method to manage an internal combustion engine within a hybrid vehicle system is disclosed. The vehicle system includes at least two machines capable of being coupled to and capable of providing motive force to the vehicle's driving wheels; one of which is an internal combustion engine. In the method, whether the current engine operating condition satisfies the needs of an engine dependent auxiliary device is determined. If the engine dependent auxiliary device is not satisfied, a desired engine operating condition, which satisfies the engine dependent auxiliary device, is determined and the engine is caused to attain the desired engine operating condition.

An advantage of the present invention is that by operating the engine at its most efficient operating condition while providing a secondary function, such as cabin cooling, the fuel penalty exacted by providing that secondary function is minimized. This is possible because the internal combustion engine, which is installed in a hybrid vehicle system, need not be constrained to develop torque which matches the power demanded by the driver.

A further advantage of the present invention is that torque fluctuations of the engine to provide transitions, for the purposes of a secondary device, may be made without affecting torque at the driving wheels. The process of making transitions is greatly simplified because engine torque need not be constant; the second machine of the hybrid system may absorb excess torque or provide makeup torque desired at the driving wheels. Furthermore, transitions may take place in a more fuel efficient manner than provided in prior art. Examples are transitions between lean and rich conditions to purge a LNT, transitions to and from an operating condition which causes auto ignition of a diesel particulate filter, and transitions between stratified lean and stratified homogeneous operation in a stratified charge engine.

Still a further advantage of the present invention is that secondary functions can be provided upon demand rather than having to postpone providing the function or inadequately providing the function. Examples include heating the cabin of a vehicle equipped with a diesel engine and regenerating a diesel particulate filter, both of which may suffer significant delay in prior art methods.

Yet a further advantage of the present invention is that it may be possible to attend to two secondary devices simultaneously. As an example, vapor purge and LNT purge might be concurrently provided by accessing an engine operating condition which satisfies both.

Other advantages, as well as objects and features of the present invention, will become apparent from the following detailed description of the preferred embodiments when taken in connection with the accompanying drawings.

DETAILED DESCRIPTION

Figure 1:
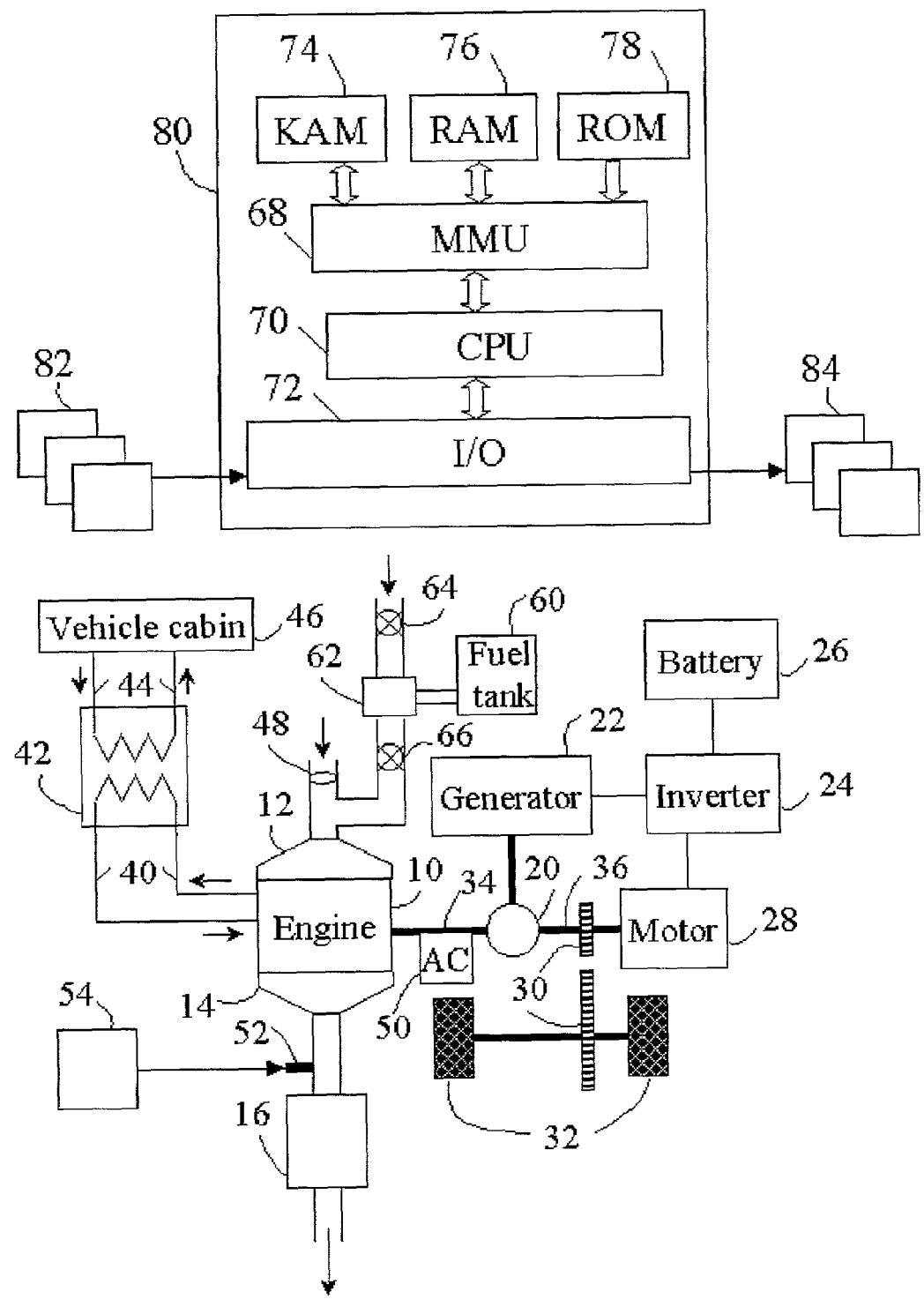
FIG. 1 is a schematic representation of an example hybrid vehicle configuration showing ancillary components which may provide secondary functions onboard the vehicle.

An example of a hybrid vehicle system is shown in FIG. 1. The hybrid vehicle has an engine 10 and electric motor 28, both of which can provide motive force to driving wheels 32. Power split device 20 is coupled to electric motor 28, generator 22, and engine output shaft 34 of engine 10. Power split device 20 may cause the output of engine 10 to be delivered to output shaft 36 or to generator 22. Output shaft 36 is coupled to the driving wheels 32 via gear set 30. Output shaft 36 may be supplied power by engine 10, electric motor 28, or a combination of the two. Generator 22 is connected to battery 26 via an inverter 24. Power generated by engine 10, which is in excess of that needed at the driving wheels 32, can be supplied to generator 22, which ultimately stores energy in battery 26. Energy can be extracted from battery 26 through inverter 24 and provided to motor 28.

The hybrid system of FIG. 1, commonly referred to as an electric hybrid, is provided as one example configuration of a hybrid-powered vehicle. Other configurations utilizing an electric motor as the secondary machine are known to those skilled in the art, sometimes referred to as serial and parallel arrangements. Another alternative is for the motor and generator functions to be performed by the same electrical machine. Other types of machines, such as flywheels and hydraulic motors, are known alternatives to an electric motor. The present invention is applicable to hybrid vehicle systems in which one of the machines is an internal combustion engine.

Continuing with FIG. 1, internal combustion engine 10 is provided fresh air from the atmosphere through throttle valve 48 and intake manifold 12 and discharges exhaust gases through exhaust manifold 14 and exhaust aftertreatment device 16.

Engine 10 may be provided with one or more exhaust aftertreatment devices, shown as a single exhaust aftertreatment device 16 in FIG. 1. Exhaust aftertreatment device 16 may be a catalyst which is provided stoichiometric exhaust products for conversion of carbon monoxide, hydrocarbons, and nitrogen oxides (NOx). Or, the exhaust aftertreatment device may be a lean NOx catalyst (LNC), which is provided lean exhaust products, i.e., those containing air in excess of the amount that would be required to completely oxidize the fuel. A LNC requires a reductant to cause the reduction of NOx. Presently known reductants are unburned hydrocarbons in the exhaust stream, fuel, hydrocarbons other than fuel and an ammonia solution. If the LNC uses a reductant other than unburned hydrocarbons or fuel, a reductant reservoir 54 and an injector 52 are provided onboard the vehicle. LNCs are susceptible to sulfur contamination. Periodic desulfurization of the LNC helps to retain high conversion efficiency in the LNC. This is accomplished by providing a high temperature in the LNC in a reducing atmosphere. Alternatively, exhaust aftertreatment device 16 may be a lean NOx trap (LNT), i.e., one with enhanced NOx storage capability. A LNT typically operates cyclically in which NOx is stored at lean operating conditions and subsequently purged at slightly rich operating conditions. NOx is reacted during the purge portion of the cycle. Or, exhaust aftertreatment device 16 may be a particulate filter, which collects particles discharged from engine 10. As a particulate filter becomes clogged after hours of operation, a need arises to regenerate the filter. Regeneration may occur by auto ignition of the particulate matter, which ensues in the presence of sufficient oxygen and high enough temperature. Alternatively, engine 10 may be stoichiometrically fueled. Stoichiometry refers to a ratio of fuel and air supplied to engine 10. If the reaction were complete, the products are carbon dioxide, water, and nitrogen only. If engine 10 were a stoichiometric engine, exhaust aftertreatment device 16 may be a three-way catalyst, which is known to provide high conversion efficiencies for carbon monoxide, hydrocarbons, and NOx. Also, exhaust aftertreatment device 16 be an oxidation catalyst. It is known to those skilled in the art that the vehicle may contain a multiplicity of aftertreatment devices and may be arranged in a variety of configurations. Element 16 of FIG. 1 refers to any combination of aftertreatment devices, i.e., in any number of each, any order, and disposed in multiple paths. For example, if engine 10 is a diesel engine, both a diesel particulate filter and a lean NOx trap may be serially arranged in an exhaust duct. If engine 10 is a V engine, that is one containing two banks of cylinders, each bank of cylinders may lead to a close coupled catalyst. Downstream of the catalysts the exhaust ducts may be connected and another catalyst. These catalysts may be oxidation catalysts or three-way catalysts.

It is known to those skilled in the art, that the effectiveness of exhaust aftertreatment devices 16 such as three way catalysts, lean NOx catalysts, lean NOx traps, and oxidation catalysts is low at low temperature. To provide the highest possible conversion efficiency of these devices, it is useful to bring them to operating temperature as soon as possible after starting or restarting the engine. The present invention addresses this issue, as discussed below.

Again referring to FIG. 1, the coolant of engine 10 is delivered to an air-to-water heat exchanger 42 through coolant lines 40. The air side of heat exchanger 44 communicates warmed air into the vehicle cabin 46.

Engine 10 of FIG. 1 may receive fuel vapors from a fuel vapor purge system, elements 62, 64, and 66 in FIG. 1. Due to temperature changes to which the vehicle is subjected, fuel vapors are released from fuel stored in fuel tank 60. Fuel tank 60 communicates with a carbon canister 62. Periodically, fuel vapors collected in carbon canister 62 may need to be purged. To do so, valves 64 and 66 are opened to allow fresh air to be admitted into carbon canister 62 to strip off absorbed fuel vapors. Fuel vapors and air are inducted into engine 10 under the influence of a depressed pressure downstream of throttle valve 48, which is caused by partial closure of throttle valve 48.

Referring still to FIG. 1, an air-conditioning compressor 50 is driven off engine output shaft 34. The associated condenser and heat exchanger to achieve temperature reduction in the vehicle cabin is well known and not shown.

In FIG. 1, electronic control unit (ECU) 80 has a microprocessor 70, called a central processing unit (CPU), in communication with memory management unit (MMU) 68. MMU 68 controls the movement of data among the various computer readable storage media and communicates data to and from CPU 70. The computer readable storage media preferably include volatile and nonvolatile storage in read-only memory (ROM) 78, random-access memory (RAM) 76, and keep-alive memory (KAM) 74, for example. KAM 74 may be used to store various operating variables while CPU 70 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 70 in controlling the engine or vehicle into which the engine is mounted. The computer-readable storage media may also include floppy disks, CD-ROMs, hard disks, and the like. CPU 70 communicates with various sensors 82 and actuators 84 via an input/output (I/O) interface 72. Some ECU 80 architectures do not contain MMU 68. If no MMU 68 is employed, CPU 70 manages data and connects directly to ROM 78, RAM 76, and KAM 74. Of course, the present invention could utilize more than one CPU 70 to provide engine/vehicle control and ECU 80 may contain multiple ROM 78, RAM 76, and KAM 74 coupled to MMU 68 or CPU 70 depending upon the particular application.

Continuing with FIG. 1, I/O interface 72 of ECU 80 communicates with sensors 82 and actuators 84 or electronic drivers. Sensors 82 may be sensing: temperature (ambient, coolant, oil, cabin, exhaust, as eg.), exhaust stoichiometry, inlet air pressure, inlet airflow rate, exhaust gas component concentrations, throttle valve 48 position, position of vapor purge throttles 64 and 66, liquid tanks levels, and others. Actuators 84 may be: a throttle valve controller, a position of an exhaust gas recirculation valve (not shown), a reductant injector 52 driver, an air-conditioning compressor 34 clutch, a power split device 20, valves controlling cabin climate (not shown), and others. The connections between the sensors 82 and actuators 84 to ECU 80 are not explicitly shown in FIG. 1.

Figure 2:
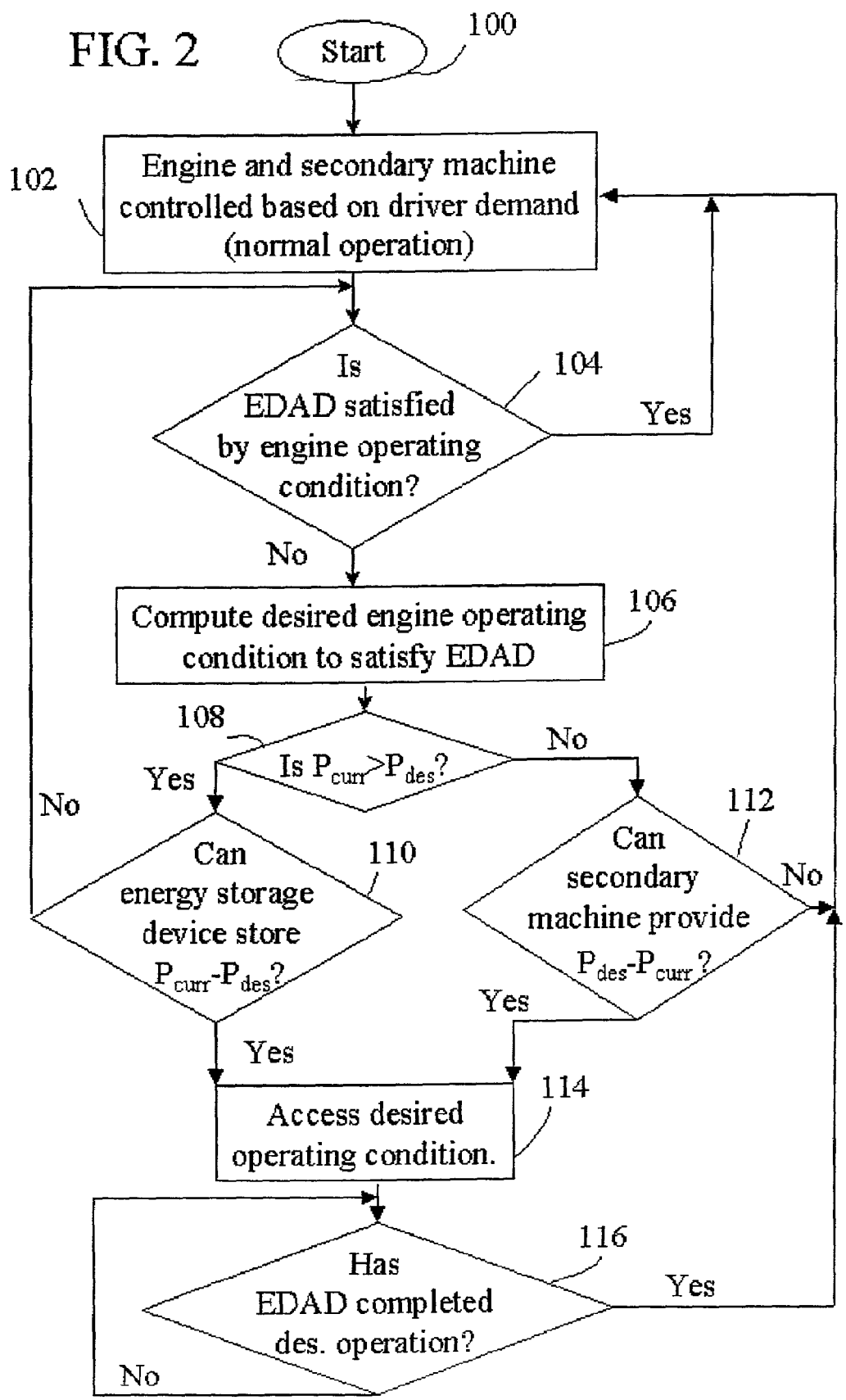
FIG. 2 is a flowchart showing the method disclosed herein according to an aspect of the present invention.

Prior to discussing the flowchart in FIG. 2 in detail, engine conditions satisfying engine dependent auxiliary devices are discussed.

A first type of engine dependent auxiliary devices (EDADS) are satisfied, typically, by high power engine operating conditions. Thus, if these types of devices are not satisfied, it is typically because the current engine operating condition is low power. For example, cabin heating performance of a diesel-equipped vehicle is hampered by engine 10 operating condition being at too low a power level. Another example is removing sulfur from a LNC in which a high LNC temperature for a period of time is needed.

A second type of EDADs is satisfied, typically, by low power engine operating conditions. For example, a vapor purge system relies on a pressure depression in the intake line to cause the flow of gases through carbon canister 62. The pressure depression occurs at throttled conditions, which are lower power conditions. Thus, if the current engine operating condition does not support vapor purge, it is likely to be due to engine 10 operating at high power.

There is a third type of EDADs which have multiple engine operating conditions at which they are satisfied. For example, it has been found that a LNC which uses a reductant, such as ammonia-containing urea, has much higher NOx conversion efficiency in the 140–250° C. temperature range if reductant has previously been stored within the catalyst under specific conditions. A first condition leading to the effective storage of reductant is that NOx concentration of the exhaust gases entering the LNC be less than about 25 ppm, which occurs at a low power engine operating condition. A second condition at which reductant can be effectively stored is when the LNC is at a temperature greater than about 300° C., which occurs at a high power engine operating condition. Thus, the third type of EDADs have both a high power and a low power operating condition appropriate for satisfying the EDAD.

Finally, there is a type of EDAD which requires temporary transitions to an alternate operating condition to satisfy their demands. An example is a diesel particulate filter which must be periodically regenerated. A high power condition may be required to cause a sufficiently high temperature in the exhaust system to cause auto ignition of the particulate matter. After auto ignition of the particulate matter the engine operating condition may be returned to its previous condition. This situation may be handled by considering the EDAD to exhibit behavior of the first type of EDADs followed by the EDAD exhibiting behavior of the second type of EDADs or vice versa, depending on the EDAD.

In FIG. 2, a flowchart of a preferred embodiment of the present invention is shown. The process starts in block 100 and continues in block 102, in which engine 10 and the secondary machine are controlled based on the normal operating strategy, which is separate from the present invention. An example of a normal operating strategy is shown in U.S. Pat. No. 6,196,344, which is incorporated by reference herein. Block 104 is executed, periodically, to determine if engine dependent auxiliary devices are satisfied. EDADs may be a fuel vapor purge system (62, 64, and 66 of FIG. 1), an exhaust aftertreatment device 16 or devices, air conditioning system (34), and cabin heating system (40, 42, and 44). If EDADs are satisfied, the secondary function may be provided and control is returned to block 102 for continued normal operation. If the EDAD is satisfied by the current operating condition, control passes to block 116, which will be discussed in detail below. If an EDAD is not satisfied, control is passed to block 106 in which a desired engine operating condition to satisfy the EDAD is computed. Control is then passed to block 108 in which it is determined whether the current operation power, $P_{curr}$, is greater than the power of the desired engine operating condition, $P_{des}$. If the $P_{des}$ is greater than $P_{curr}$, control passes to block 110, in which it is determined whether the energy storage device has sufficient capacity to store the power in excess of what is required at the driving wheels 32. These tend to be EDADs of the first type that fall along this branch (block 110) of the flowchart. Normally, the battery 26 or other energy storage device can absorb the excess energy. However, there may be situations in which the energy storage device is at capacity and cannot absorb more energy. If the energy storage device cannot store additional energy, accessing the desired operating condition that satisfies the EDAD must be delayed. This is accomplished by passing control to 104. The series of steps discussed above may be performed many times until the operating condition desired by the EDAD can be accessed. If, however, $P_{curr}$ were found to be greater than $P_{des}$ in block 108, control passes to block 112 in which it is determined whether the power in excess of $P_{curr}$ to provide $P_{des}$ can be made up by the secondary machine. (The second type of EDADs to fall into block 112 of FIG. 2.) Typically, the secondary machine has sufficient capacity to makeup power required at the driving wheels 32. Rarely occurring counter examples are situations in which amount of energy stored in the energy storage device is nearly depleted and thus cannot supply the secondary machine and when the demanded power by the operator is at a peak level, i.e., beyond the capacity of the secondary machine to provide. If the rare case of a negative result in 112, control returns to block 104. Blocks 104, 106, 108 and 112 are looped multiple times until a positive result in block 112 is returned. A positive result in either block 110 or 112 causes control to pass to block 114 in which the desired operating condition is accessed. Depending on which branch the flowchart came through to arrive at 114, either excess power is developed in engine 10, with excess power being stored as energy in the energy storage device, or makeup power is supplied by the secondary machine. Control passes to block 116 in which an operating condition of engine 10 is accessed so the secondary function can be accomplished. In block 118, it is determined whether the EDAD has completed its operation and continues to loop while it is not complete. When block 118 returns a positive result, control returns to block 102, i.e., normal operation.

A situation may arise in which a secondary function is demanded during a condition in which engine 10 is not operating. Clearly, exhaust aftertreatment devices need not be serviced as they are not processing exhaust products when engine 10 is deactivated. However, cabin heating or cooling needs may arise. Or, carbon canister 62 may need to be purged. In these cases, engine 10 is reactivated (in block 114 of FIG. 2) to provide a desired engine operating condition to satisfy the engine dependent auxiliary device.

Figure 3:
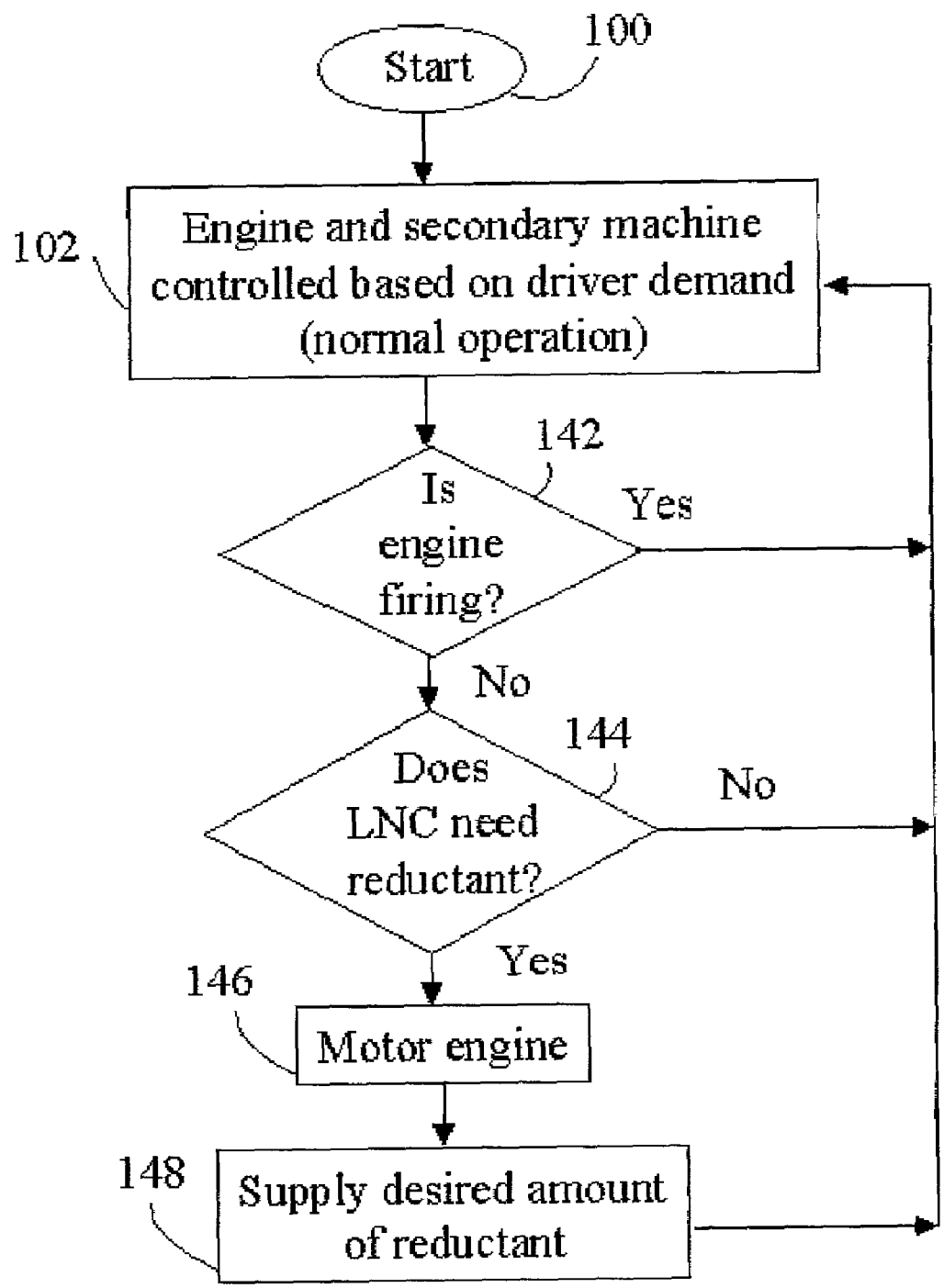
FIG. 3 is a flowchart showing the method disclosed herein according to an aspect of the present invention.

An opportunity for providing reductant to a LNC during a period when engine 10 is not operating may be exploited. As mentioned above, it has been found that a LNC reduces NOx at higher if it has previously been supplied reductant when the gases in the LNC have NOx concentration less than about 25 ppm. Referring to FIG. 3, the routine is begun in block 100 and continues to normal operation, block 102. In block 142, it is determined whether the engine is firing. If affirmative, control returns to block 102. If block 142 returns a negative result, control passes to block 144, in which it is determined whether the LNC requires reductant to be added. If a negative result, control returns via block 102. If a positive result is returned in block 144, control proceeds to block 146, in which engine 10 is caused to motor, under power supplied by electric motor 28. By motoring engine 10, fresh air is drawn into engine 10 and discharged into the exhaust system through exhaust aftertreatment device 16. Control passes to block 148, in which a desired amount of reductant is supplied to the exhaust stream. As the exhaust flow is fresh air, it contains a negligible concentration of NOx, much less than a 25 ppm threshold. Control passes next to block 102, normal engine operation. If the normal strategy would have engine 10 inactive, engine 10 would return to its previous inactive state. In this way, reductant can be supplied to the LNC to store reductant within it, which preconditions the LNC to enable it to more effectively reduce NOx when the engine is reactivated at a later time.

As mentioned above, a common issue in exhaust aftertreatment devices 16 is in attaining a temperature which provides high conversion efficiency rapidly after engine starting. The present invention provides for this need. Similarly to cabin heating, the typical situation is that it would be preferred to operate the engine at high power. However, the driver demand shortly after starting is often low power. A hybrid vehicle offers the opportunity of operating the engine at high power to bring exhaust aftertreatment devices 16 quickly to operating temperature because excess energy developed by the engine can be stored in a secondary machine.

While several modes for carrying out the invention have been described in detail, those familiar with the art to which this invention relates will recognize alternative designs and embodiments for practicing the invention. Thus, the above-described embodiments are intended to be illustrative of the invention, which may be modified within the scope of the following claims.

The invention claimed is:

1. A vehicle system comprising:
at least two machines capable of being coupled to driving wheels of the vehicle, one of said machines being a diesel internal combustion engine, and another of said machines being an electric motor;
at least one catalyst coupled to said engine for reducing NOx generated by the internal combustion engine depending on exhaust gas air/fuel ratio; and
an engine controller operably connected to said machines to determine when conditions should be adjusted based on conditions of said catalyst and to determine whether a current engine operating condition is within an acceptable engine operating range.

2. The vehicle system of claim 1 wherein said catalyst is a lean NOx trap.

3. The vehicle system of claim 1 wherein said catalyst is a lean NOx catalyst.

4. The vehicle system of claim 1 wherein said catalyst is a three-way catalyst configured to convert carbon monoxide, hydrocarbons, and NOx in a stoichiometric exhaust.

5. The vehicle system of claim 1 further comprising a particulate filter.

6. The vehicle system of claim 1 further comprising an energy reservoir configured to store energy generated from at least one of said machines.

7. The vehicle system of claim 1 wherein said controller further adjusts an engine operating condition based on said conditions of said catalyst.

8. The vehicle system of claim 7 wherein energy reservoir comprises a battery.

* * * * *